United States Patent
Zhang et al.

(10) Patent No.: US 9,386,663 B2
(45) Date of Patent: Jul. 5, 2016

(54) MONITORING SYSTEM AND METHOD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Shao-Bo Zhang, Wuhan (CN); Jian-Hung Hung, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/594,508

(22) Filed: Jan. 12, 2015

(65) Prior Publication Data

US 2016/0150621 A1 May 26, 2016

(30) Foreign Application Priority Data

Nov. 21, 2014 (CN) .......................... 2014 1 0671596

(51) Int. Cl.
 H05B 37/02 (2006.01)
 H05B 39/04 (2006.01)
 H05B 41/36 (2006.01)
(52) U.S. Cl.
 CPC .................................. H05B 37/0218 (2013.01)
(58) Field of Classification Search
 None
 See application file for complete search history.

(56) References Cited

U.S. PATENT DOCUMENTS

| 7,507,001 | B2 * | 3/2009 | Kit | F21K 9/17 315/51 |
| 2010/0026195 | A1 * | 2/2010 | Potter | H05B 37/0218 315/158 |
| 2012/0019149 | A1 * | 1/2012 | Shih | H05B 37/0227 315/149 |
| 2014/0326888 | A1 * | 11/2014 | Barlow | G01S 5/16 250/342 |

* cited by examiner

Primary Examiner — Anh Tran
(74) Attorney, Agent, or Firm — ScienBiziP, P.C.

(57) ABSTRACT

A monitoring system and method can determine whether an ambient intensity surrounding a computer is suitable for a user when the user is working with the computer. The system and method can adjust the intensity of a light source in responds to the ambient intensity being unsuitable for the user.

12 Claims, 3 Drawing Sheets

MONITORING SYSTEM AND METHOD

FIELD

The subject matter herein generally relates to a monitoring system and method for electronic devices.

BACKGROUND

Office lighting may be unsuitable for employees working on computers and may negatively affect the eyesight of the employees without warning.

BRIEF DESCRIPTION OF THE DRAWINGS

Implementations of the present technology will now be described, by way of example only, with reference to the attached figures.

DETAILED DESCRIPTION

Figure 1:
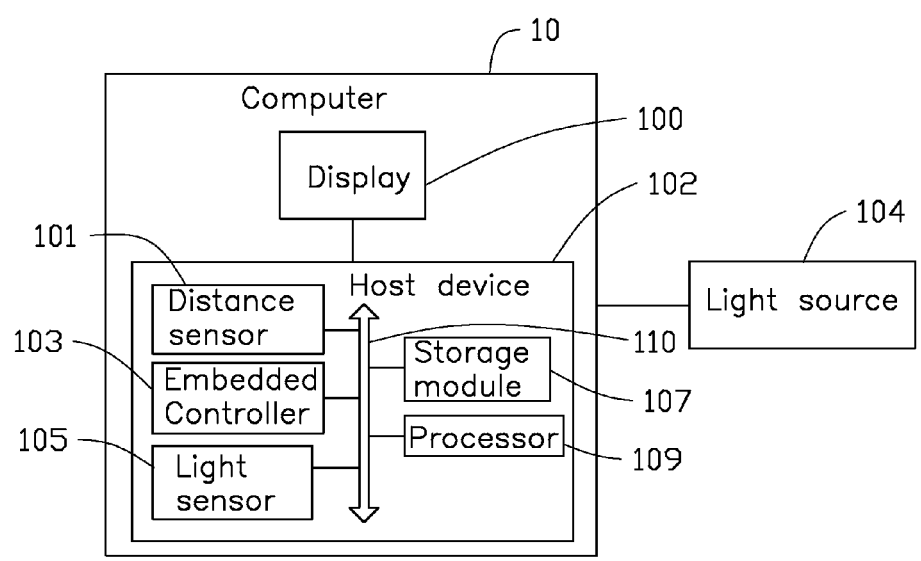
FIG. 1 is a block diagram of a monitoring system of the present disclosure, wherein the monitoring system comprises a storage module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The present disclosure is described in relation to a monitoring system and method for electronic devices, such as computers.

FIG. 1 illustrates a monitoring system for monitoring an ambient intensity of a light source around the electronic devices. In one embodiment, the system can monitor the ambient intensity of the light source 104 surrounding a computer 10. In other embodiments, the system can monitor the ambient intensity of the light source of a hand-phone.

In one embodiment, the computer 10 can comprise a display 100 and a host device 102 coupled to the display 100, such as through a video cable. In other embodiments, the computer 10 can be an all-in-one computer or a notebook computer.

The host device 102 can comprise a distance sensor 101, an embedded controller 103, a light sensor 105, a storage module 107, a bus 110, and a processor 109. In one embodiment, the distance sensor 101, the embedded controller 103, the light sensor 105, and the storage module 107 can communicate with the processor 109 through the bus 110.

The distance sensor 101 can detect a distance between a user and the computer 10, and output a distance signal related to the distance.

The light sensor 105 can detect an ambient intensity surrounding the computer, and output a light signal related to the ambient intensity.

The embedded controller 103 can retrieve the distance signal and the light signal from the bus 101.

In one embodiment, the embedded controller 103 can predefine a first value and a second value. The embedded controller 103 can obtain the distance between the user and the computer 10 according to the distance signal, and determine whether the distance is less than the first value. In one embodiment, if the distance between the user and the computer 10 is less than the first value, the user may work with the computer 10. The embedded controller 103 can further obtain the ambient intensity surrounding the computer 10 according to the light signal. In one embodiment, if the ambient intensity surrounding the computer 10 is less than the second value, it indicates that the ambient intensity is not suitable for the user.

In one embodiment, when the distance between the user and the computer 10 detected by the embedded controller 103 is less than the first value, the embedded controller 103 further determines whether the ambient intensity surrounding the computer 10 is less than the second value, and the embedded controller 103 can output an interrupt signal in response to the ambient intensity being less than the second value.

The storage module 107 can store a plurality of programs to be executed by the processor 109, to perform certain functions.

Figure 2:
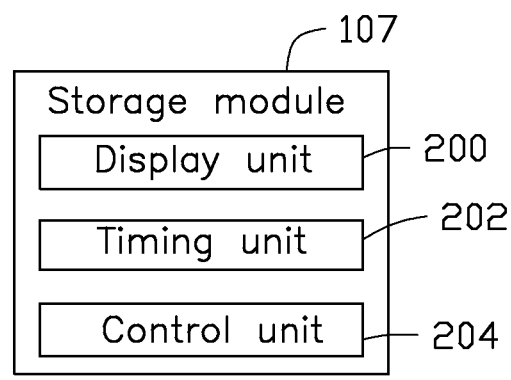
FIG. 2 is a block diagram of the storage module of FIG. 1.

FIG. 2 illustrates that the storage module 107 can comprise a display unit 200, a timing unit 202, and a control unit 204.

In one embodiment, the control unit 204 can receive the interrupt signal from the embedded controller 103. The control unit 204 can generate a warning signal in response to receiving the interrupt signal.

The display unit 200 can receive the warning signal, and display warning window on the display 100. In one embodiment, the display 100 can be a touch-sensing display. The display unit 200 can detect the user's input operation. For example, the display unit 200 can generate a response signal when the warning window is clicked by the user.

The timing unit 202 can perform a timing operation. In one embodiment, the control unit 204 can receive the response signal from the display unit 200; the control unit 204 can control the timing unit 202 to performing the timing operation as receiving the response signal. The timing unit 202 then can perform a predetermined time of the timing operation, such as the predetermined time with 1 minute. In one embodiment, during the predetermined time of timing operation, the control unit 204 does not output the warning signal when the control unit 204 receives the interrupt signal from the embedded controller 103. Accordingly, when the user clicks the warning window, it indicates that the user has realized that the ambient intensity is not suitable; the control unit 204 dose not output the warning signal even through the interrupt signal may be continuously received from the embedded controller 103 during the predetermining time, thereby preventing the warning message from showing too frequently.

In one embodiment, when the timing operation is completed, the timing unit 202 can output a complete signal to the control unit 204. The control unit 204 can still output the warning signal after the timing operation being completed, in response to receiving the interrupt signal from the embedded controller 103.

In one embodiment, the light source 104 can be a lamp; the lamp can be turned on manually by the user as the warning window showing up.

In other embodiments, the light source 104 can be a wireless intelligent lamp. The control unit 204 can output a control signal to the light source 104 to increase the ambient intensity automatically through a wireless network, in response to receiving the interrupt signal from the embedded controller 103.

Figure 3:
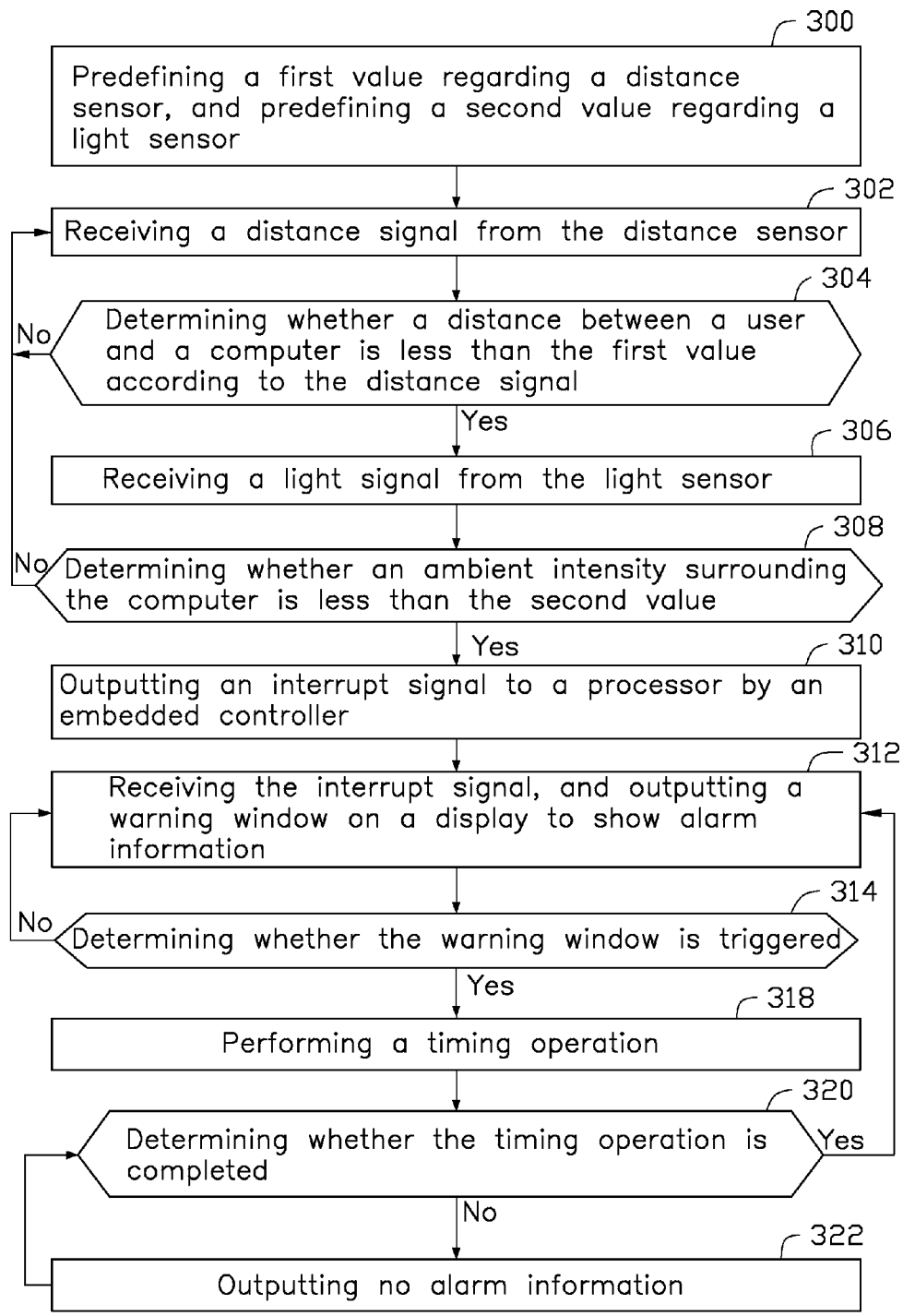
FIG. 3 is a flow chart of a monitoring method of the present disclosure.

FIG. 3 illustrates a monitoring method of the present disclosure. The monitoring method can comprise blocks as following.

At block 300, the embedded controller 103 can predefine a first value corresponding to the distance sensor 101, and predefine a second value corresponding to the light sensor 105.

At block 302, the embedded controller 103 can receive a distance signal from the distance sensor 100, regarding a distance between a user and a computer.

At block 304, the embedded controller 103 can determine whether the distance between the user and the computer is less than the first value. When the distance between the user and the computer is less than the first value, block 306 is implemented. When the distance between the use and the computer is greater or equal to the first value, return to the block 302.

At block 306, the embedded controller 103 can receive a light signal from the light sensor 105.

At block 308, the embedded controller 103 can determine whether an ambient intensity surrounding the computer is less than the second value. When the ambient intensity is less than the second value, block 310 is implemented. When the ambient intensity is greater or equal to the second value, returning to the block 302.

At block 310, the embedded controller 103 can output an interrupt signal to the processor 109.

At block 312, the processor 109 can receive the interrupt signal, and output a warning window on the display, to show warning information on the display.

At block 314, the processor 109 can determine whether the warning window is triggered. When the warning window is triggered, block 318 is implemented. When the warning window is not trigger, returning to bock 312.

At block 318, the processor 109 can perform a predetermined time of timing operation, such as 1 minute.

At block 320, the processor 109 can determine whether the timing operation is completed. When the timing operation is not completed, block 322 is implemented. When the timing operation is completed, returning to the block 312.

At block 322, the processor 109 can output no alarm information.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A monitoring system comprising:
a distance sensor outputting a distance signal regarding a distance between a user and an electronic device;
a light sensor outputting a light signal regarding an ambient intensity surrounding the electronic device;
an embedded controller predefining a first value and a second value, wherein the embedded controller receives the distance signal, and determines whether the distance between the user and the electronic device is less than the first value; the embedded controller determines whether the ambient intensity is less than the second value according to the light signal, in response to the distance being less than the first value; the embedded controller outputs an interrupt signal when the ambient intensity is less than the second value;
a processor; and
a storage module storing a plurality of programs to be executed by the processor to perform certain functions, the storage module comprising:
a control unit outputting a control signal to a light source, in response to receiving the interrupt signal, to increase the intensity of the light source.

2. The monitoring system of claim 1, wherein the storage module further comprises a display unit, when the control unit receives the interrupt signal from the embedded controller, the control unit outputs a warning signal to the display unit, and the display unit shows warning information on a display.

3. The monitoring system of claim 2, wherein when the control unit outputs the warning signal, the display unit further displays a warning window on the display; and the display unit outputs a response signal when the warning window is triggered.

4. The monitoring system of claim 3, wherein the storage module further comprises a timing unit, the timing unit is configured to perform a predetermined time of timing operation; when the control unit receives the response signal, the control unit controls the timing unit to perform the timing operation.

5. The monitoring system of claim 4, wherein when the timing operation is completed, the timing unit outputs a complete signal; when the control unit does not receive the complete signal, and the interrupt signal is received by the control unit, the control unit does not output the warning signal; when the control unit receives the complete signal and the interrupt signal, the control unit outputs the warning signal.

6. The monitoring system of claim 5, wherein the electronic device is a computer.

7. A monitoring method comprising:
predefining a first value and a second value by an embedded controller;
receiving a distance signal from a distance sensor;
determining whether a distance between a user and an electronic device is less than the first value by the embedded controller, according to the distance signal;
receiving a light signal from a light sensor in response to the distance between the user and the electronic device being less than the first value;
determining whether an ambient intensity is less than the second value by the embedded controller, according to the light signal;
outputting an interrupt signal in response to the ambient intensity being less than the second value; and
outputting a control signal to a light source as receiving the interrupt signal by a processor.

8. The monitoring method of claim 7, further comprising:
displaying warning information on a display in response to receiving the interrupt signal by the processor.

9. The monitoring method of claim 8, further comprising:
displaying a warning window on the display in response to receiving the interrupt signal by the processor;
performing a predetermined time of timing operation when the warning window is triggered; and outputting no warning information during the timing operation when the processor receives the interrupt signal.

10. The monitoring method of claim 9, further comprising: outputting the warning information after the timing operation is completed when the processor receives the interrupt signal.

11. The monitoring method of claim 10, wherein the predetermined time is one minute.

12. The monitoring method of claim 10, wherein the electronic device is a computer.

* * * * *